(12) United States Patent
Beaumont-Smith et al.

(10) Patent No.: US 8,285,947 B2
(45) Date of Patent: Oct. 9, 2012

(54) STORE HIT LOAD PREDICTOR

(75) Inventors: Andrew J. Beaumont-Smith, Cambridge, MA (US); John H. Mylius, Framingham, MA (US)

(73) Assignee: Apple Inc., Cupertino, CA (US)

( * ) Notice: Subject to any disclaimer, the term of this patent is extended or adjusted under 35 U.S.C. 154(b) by 877 days.

(21) Appl. No.: 12/366,836

(22) Filed: Feb. 6, 2009

(65) Prior Publication Data

US 2010/0205384 A1      Aug. 12, 2010

(51) Int. Cl.
  *G06F 12/00* (2006.01)
(52) U.S. Cl. ................... 711/154; 711/E12.001
(58) Field of Classification Search .............. 711/154
  See application file for complete search history.

(56) References Cited

U.S. PATENT DOCUMENTS 6,108,770 A * 8/2000 Chrysos et al. ............. 712/216
6,622,237 B1    9/2003 Keller et al.
7,181,598 B2 * 2/2007 Jourdan et al. ............. 712/217
7,415,597 B2 * 8/2008 Filippo et al. ............. 712/218

* cited by examiner

*Primary Examiner* — Kevin Ellis
*Assistant Examiner* — Aracelis Ruiz
(74) *Attorney, Agent, or Firm* — Lawrence J. Merkel; Meyertons, Hood, Kivlin, Kowert & Goetzel, P.C.

(57) ABSTRACT

In one embodiment, a processor implements a store hit load predictor. The store hit load predictor is configured to monitor fetched ops in the processor, and is configured to detect stores that may have previously caused store hit load events. The store hit load predictor is configured to predict that the store will cause a store hit load event again, and is further configured to monitor subsequent fetched ops for the load. The store hit load predictor may locate the load using, e.g., an offset from the store to the load in the code sequence. In response to locating the load, the store hit load predictor may create a dependency of the load on the store, preventing the load from executing out of order with respect to the store. A store hit load event may be avoided in this fashion, at least in some cases.

20 Claims, 5 Drawing Sheets

STORE HIT LOAD PREDICTOR

BACKGROUND

1. Field of the Invention

This invention is related to the field of processors and, more particularly, to processing load/store memory operations in processors.

2. Description of the Related Art

Processors generally include support for load memory operations and store memory operations to facilitate transfer of data between the processors and memory to which the processors may be coupled. As used herein, a load memory operation is an operation specifying a transfer of data from a main memory to the processor (although the transfer may be completed in cache). A store memory operation is an operation specifying a transfer of data from the processor to memory. Load and store memory operations may be an implicit part of an instruction which includes a memory operation, or may be explicit instructions, in various implementations. Load and store memory operations are more succinctly referred to herein as loads and stores, respectively.

A given load/store specifies the transfer of one or more bytes beginning at a memory address calculated during execution of the load/store. This memory address is referred to as the data address of the load/store. The load/store itself (or the instruction from which the load/store is derived) is located by an instruction address used to fetch the instruction, also referred to as the program counter address (or PC). The data address is typically calculated by adding one or more address operands specified by the load/store to generate an effective address or virtual address, which may optionally be translated through an address translation mechanism to a physical address of a memory location within the memory.

Many processors execute loads speculatively, and out of program order with respect to other instructions (more briefly "out of order" herein). The program order of operations is the order in which the operations would be executed if they were executed one at a time and non-speculatively. The program order is created by the programmer (and/or compiler) of the program being executed. The loads can execute out of order with respect to previous stores to the same data address (or at least an overlapping addresses, where at least one byte updated by the store is accessed by the load). In such cases, the speculative execution of the load returns incorrect data. When the prior store is subsequently executed, the incorrect speculative execution of the load is detected. The incorrect data must be flushed and the correct data accessed. Performance is reduced in the processor when the corrective actions are needed.

SUMMARY

In one embodiment, a processor implements a store hit load predictor. The store hit load predictor is configured to monitor fetched ops in the processor, and is configured to detect stores that may have previously caused store hit load events. The store hit load predictor is configured to predict that the store will cause a store hit load event again, and is further configured to monitor subsequent fetched ops for the load. The store hit load predictor may locate the load using, e.g., an offset from the store to the load in the code sequence. In response to locating the load, the store hit load predictor may create a dependency of the load on the store, preventing the load from executing out of order with respect to the store. A store hit load event may be avoided in this fashion, at least in some cases.

The store hit load predictor may be trained when load replays are detected for store hit load events. Specifically, the store hit load predictor may be provided with at least a portion of the PC of the store that hit the load, along with an indication of the offset between the load and the store. The store hit load predictor may capture the store PC and the offset, and may compare the PCs of subsequent fetched ops to detect the store and predict the store hit load event.

BRIEF DESCRIPTION OF THE DRAWINGS

The following detailed description makes reference to the accompanying drawings, which are now briefly described.

Figure 1:
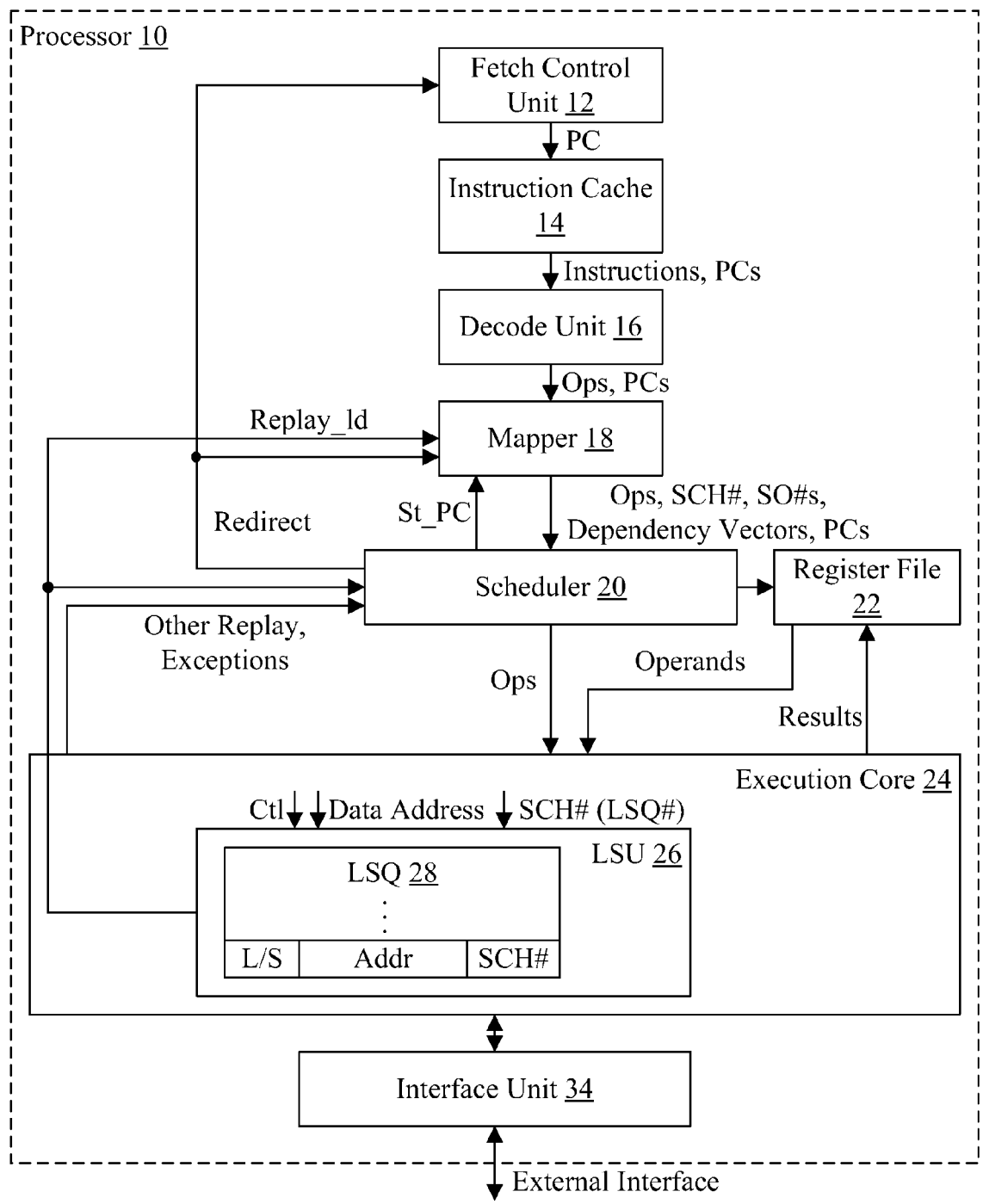
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

In one embodiment, a processor includes a store hit load predictor configured to predict which stores will hit previous loads that were executed out of order. In response to fetching a store for execution, the store hit load predictor may predict that a subsequently fetched load will be hit by the store if the load is executed out of order. The store hit load predictor may also use an offset recorded with the store in the predictor to locate the subsequently fetched load. That is, the store hit load predictor may count subsequent instruction operations that pass through the store hit load predictor until the offset from the store is reached, and then may create a dependency for the load at the indicated offset on the store. Accordingly, using the normal dependency resolution logic in the processor, the load is prevented from executing prior to the store. The store hit load event may thus be avoided.

The offset measures the distance between the store and the subsequent load. The offset may include the subsequent load, in some embodiments, or may only measure the instruction operations between the load and the store, in other embodiments. The distance may be measured in instruction operations, according to the program order of the operations. The instruction operations may be instructions, or may be derived from instructions, as described in more detail below. Other embodiments may measure the distance in instructions (even if multiple instruction operations may be derived from an instruction), or as the difference between the load and store PCs.

Because the instruction operations may not necessarily have a one to one correspondence, a fetched instruction operation may generally refer to the instruction operations that are generated in response to a fetched instruction, prior to the execution of the instruction. For example, the fetched instruction operations may be decoded by hardware decode circuitry from the fetched instructions, may be microcode instructions that are read from a microcode memory in response to a fetched instruction, or any combination thereof. Accordingly, the fetched instruction operations (included fetched loads and fetched stores) are instruction operations that have been decoded but not yet issued for execution.

In some embodiments, multiple instruction operations are fetched and passed through the store hit load predictor in parallel. Accordingly, a subsequently fetched load may actually be fetched in parallel with a fetched store on which the fetched load is to depend. Accordingly, a "subsequently fetched load" may include a load that is subsequent to a store in program order that is fetched concurrently with the store.

Because the store hit load events are detected and tracked by store operation in the present embodiment, a given load may be made dependent on multiple stores. If a load can be hit by multiple stores, the ability to make the load dependent on multiple stores may improve the store hit load prediction accuracy, and thus may improve performance. There are numerous cases in which such operation may be useful. For example, some instruction set architectures permit loads and stores of different sizes (e.g. byte, halfword, word, doubleword, etc.). A load of a larger size can overlap with multiple stores of a smaller size. Another example is predicated execution, in which stores can be predicated with a condition that determines whether or not the store is actually performed. During some executions, one predicated store may complete successfully (and may hit the load), and during other executions a different predicted store may complete successfully (and may hit the load). By permitting the load to be dependent on each of the predicated stores, the store hit load event may be prevented independent of which store actually succeeds during the current execution. Still another example is the case of an unaligned load that overlaps portions of two or more stores. The above examples are not exhaustive, and not meant to be limiting.

An exemplary processor in which the store hit load predictor may be implemented is shown in FIG. 1. While FIG. 1 illustrates one exemplary processor, other processors having different microarchitectures may also be used.

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The mapper 18 is coupled to provide ops, a scheduler number (SCH#), source operand numbers (SO#s), one or more dependency vectors, and PCs to the scheduler 20. The scheduler 20 is coupled to receive replay and exception indications from the execution core 24, is coupled to provide a redirect indication to the fetch control unit 12 and the mapper 18, is coupled to the register file 22, and is coupled to provide ops for execution to the execution core 24. The scheduler is further configured to provide a store PC (St_PC) to the mapper 18. The execution core 24, and more particularly a load/store unit (LSU) 26 in the execution core 24, is configured to provide a relay load indication (Replay_Id) to the scheduler 20 and the mapper 18. The register file is coupled to provide operands to the execution core 24, and is coupled to receive results to be written to the register file 22 from the execution core 24. The execution core 24 is coupled to the interface unit 34, which is further coupled to an external interface of the processor 10.

In the illustrated embodiment, the execution core 24 includes the LSU 26, which includes a load/store queue (LSQ) 28. The LSU 26 is coupled to receive data addresses from other circuitry in the execution core 24 (e.g. one or more address generation units, not shown, that generate the data address from one or more operands and/or a translation lookaside buffer (TLB) that translates the data address). The LSU 26 may further receive a scheduler number (SCH#) and optionally and load/store queue number (LSQ#) corresponding to the load/store operation and various control data (Ctl) including an indication of load or store, a size, etc.

The fetch control unit 12 may comprise any circuitry configured to generate PCs for fetching instructions. The fetch control unit 12 may include, for example, branch prediction hardware configured to predict branch instructions and to fetch down the predicted path. The fetch control unit 12 may also be redirected (e.g. via misprediction, exception, interrupt, flush, etc.). In the illustrated embodiment, the redirection may be provided by the scheduler 20. In other embodiments, redirection may be provided by the execution core 24, or some redirects may be provided from the execution core 24 while others are provided from the scheduler 20.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the performance of the operations defined for that instruction according to the instruction set architecture. In some embodiments, each instruction may decode into a single instruction operation. The decode unit 16 may be configured to identify the type of instruction, source operands, etc., and the decoded instruction operation may comprise the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In one embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent. In one embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

In some embodiments, the mapper 18 may also be configured to assign LSQ entries to loads and stores. In this manner, loads and stores may be assigned LSQ entries in program order, and thus program order may be inferred from the LSQ 28 itself. In other embodiments, the LSQ entries may be assigned during execution and the SCH# may indicate order.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 24. When an op is scheduled, the scheduler 20 may be configured to read its source operands from the register file 22 and the source operands may be provided to the execution core 24. The execution core 24 may be configured to return the results of ops that update registers to the register file 22. In some cases, the execution core 24 may forward a result that is to be written to the register file 22 in place of the value read from the register file 22 (e.g. in the case of back to back scheduling of dependent ops).

Specifically, for loads and stores, the execution core 24 may be configured to add the address operands (and optionally translate the address) to generate the data address. The LSU 26 is configured to write the data address and other control data describing the load/store to the entry in the LSQ 28 assigned to the load/store. An exemplary entry is illustrated in FIG. 1, and includes an indication of whether the entry is storing a load or store (L/S), and address field storing the data address (Addr), and a scheduler number filed (SCH#). Other data may also be stored in each entry (size of the operation, store data for stores, etc.) not shown in FIG. 1.

For stores, the LSU 26 may also be configured to compare the data address to the data addresses in the LSQ 28. For example, the LSQ 28 may be a content addressable memory (CAM) for the data address field. If the store hits on a load in the LSQ 28, and the load is subsequent to the store in program order, the load was executed out of order and returned incorrect data as a result. In the present embodiment, the load is replayed (indicated by the Replay_Id communication from the LSU 26 to the scheduler 20 and the mapper 18). Replaying the load includes cancelling the previous execution of the load (preventing the results from being committed to architected state in the processor 10) and causing the load to be reissued by the scheduler 20 and reexecuted. Additionally, at least the ops that are dependent on the load are also reissued by the scheduler 20. In one embodiment, all ops subsequent to the load are reissued. Specifically, a replay causes a reissue/reexecution of the replayed op without refetching the op. Other embodiments may flush the load and subsequent ops and refetch, if desired.

The Replay_Id communication may include the SCH# of the load and the SCH# of the store which hit the load. The scheduler 20, in response to the Replay_Id, may be configured to read the PC from the entry indicated by the SCH# of the store, and may transmit the PC (St_PC) to the mapper 18. The mapper 18 may include the store hit load predictor described above and in more detail below, which may be updated with the store PC. Additionally, the store hit load predictor may be configured to update with an offset that describes the distance between the load and the store (e.g. the SCH# of the load minus the SCH# of the store). If the store is subsequently fetched, the store may hit in the store hit load predictor and the store hit load event may be predicted. If the load is subsequently refetched, the mapper 18 may be configured to record a dependency for the load on the store, preventing the load from executing out of order with the store and thus preventing the store hit load event.

The register file 22 may generally comprise any set of registers usable to store operands and results of ops executed in the processor 10. In some embodiments, the register file 22 may comprise a set of physical registers and the mapper 18 may be configured to map the logical registers to the physical registers. The logical registers may include both architected registers specified by the instruction set architecture implemented by the processor 10 and may also included temporary registers that may be used as destinations of ops for temporary results (and sources of subsequent ops as well). In other embodiments, the register file 22 may comprise an architected register set containing the committed state of the logical registers and a speculative register set containing speculative register state.

The interface unit 24 may generally include the circuitry for interfacing the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

In various embodiments, the processor 10 may implement any instruction set architecture.

Figure 2:
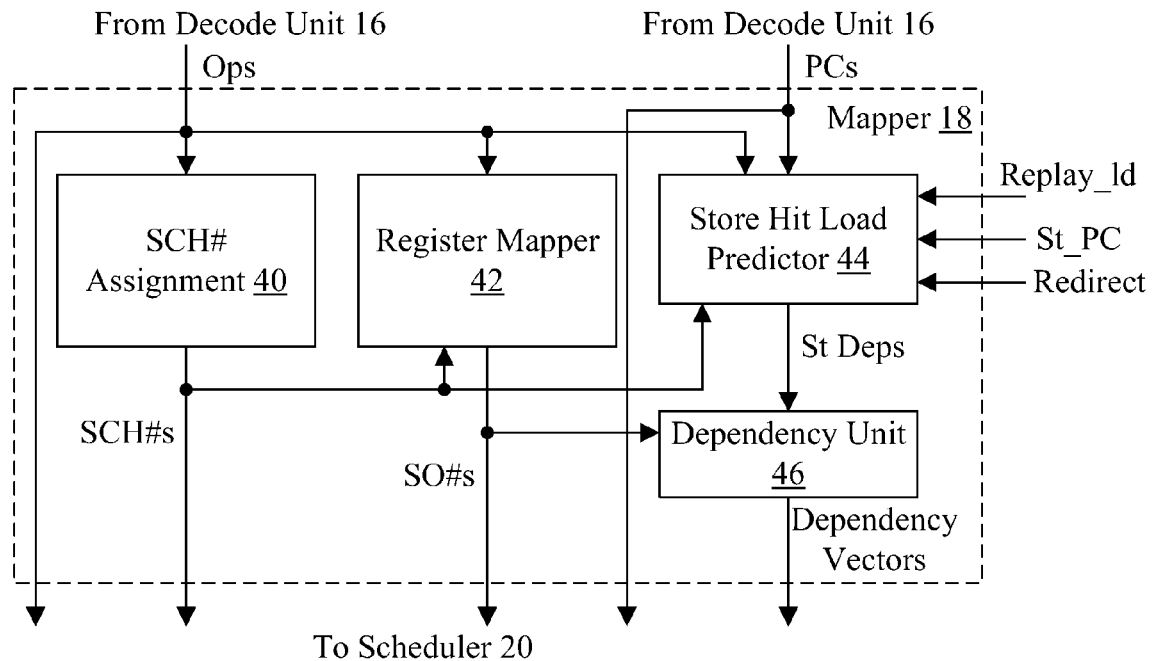
FIG. 2 is a block diagram of one embodiment of a mapper shown in FIG. 1.

Turning now to FIG. 2, a block diagram of one embodiment of the mapper 18 is shown. In the embodiment of FIG. 2, the mapper includes an SCH# assignment unit 40, a register mapper 42, a store hit load predictor 44, and a dependency unit 46. The SCH# assignment unit 40, the register mapper 42, and the store hit load predictor 44 are coupled to receive the ops from the decode unit 16 (or at least portions thereof). The store hit load predictor 44 is also coupled to receive the Replay_Id communication from the LSU 26, the St_PC from the scheduler 20, and the redirect indication from the scheduler 20. The store hit load predictor 44 is configured to provide an indication of store dependencies for each op provided from the decode unit 16 (if any) to the dependency unit 46, which is configured to generate dependency vectors for each op for transmission to the scheduler. The register mapper 42 is configured to map the source operand registers to SO#s, and to provide the SO#s to the scheduler 20 and the dependency unit 46. The SCH# assignment unit is configured to assign SCH#s to the ops and provide the SCH#s to the scheduler 20, the store hit load predictor 44, and the register mapper 42. The ops and PCs are passed through the mapper 18 to the scheduler 20 as well. It is noted that, in embodiments in which a given instruction may decode to more than one op, the PC of a given instruction may be associated with each op to which that given instruction decodes.

The store hit load predictor 44 may receive the ops from the decode unit 16, as well as the PCs for each op. The store hit load predictor 44 may be configured to check for stores in the ops, and may compare the PCs of any detected stores to the PCs of stores that previously caused store hit load events. If a PC matches for a given store, the store hit load predictor may be configured to obtain the corresponding offset and monitor subsequently fetched ops until the number of ops has exhausted the offset. Additionally, the store hit load predictor may be configured to capture the SCH# assigned to the store as an identifier of the store. In some embodiments, an offset within a set of ops to which an instruction decodes may be provided with each op in the set. As mentioned below, the offset (e.g. within a microcode sequence corresponding to the instruction) may be captured by the store hit load predictor 44 and compared along with the PC.

The op that is received at the expiration of the offset may be the load which previously executed out of order and was hit by the store. The store hit load predictor 44 may be configured to use the store identifier to generate a dependency for the load on the store, preventing the load from being issued by the scheduler 20 until after the store is issued. In one embodiment, the store hit load predictor 44 may be configured to forward the store dependencies (St Deps in FIG. 2) for the loads as a dependency vector, with the bit corresponding to the store set and other bits clear. There may be such a dependency vector for each op that may be concurrently received by the mapper 18, each dependency vector corresponding to a respective op, to permit dependencies for more than one load received concurrently to be conveyed. Additionally, using the dependency vector to transmit the store dependencies may permit an arbitrary number of stores to be recorded in the dependency vector (e.g. two or more). The dependency unit 46 may be configured to bitwise OR the store dependency vectors with the dependency vectors generated from the SO#s to generate the output dependency vectors to the scheduler 20. Other embodiments may indicate the store dependencies in other fashions (e.g. transmitting the store identifiers to the dependency unit 46 to be decoded and inserted into the resulting dependency vectors). In such an embodiment, up to a maximum number of store dependencies per op may be supported.

The store hit load predictor 44 may be configured to identify stores that cause store hit load events based on the Replay_Id indication. The indication may include the offset between the load and the store (calculated, e.g., from the SCH#s of the load and store), or may include the SCH#s and the store hit load predictor 44 may be configured to subtract the SCH# of the load from the SCH# of the store to obtain the offset. The scheduler 20 may be configured to generate the offset, in other embodiments. The scheduler 20 may be configured to read the store PC of the store indicated by the Replay_Id indication (e.g. based on the SCH# of the store), and provide the store PC to the store hit load predictor 44. The store hit load predictor 44 may thus be trained by stores which cause store hit load events, to prevent such events in the future when the same code sequence is refetched and reexecuted in the processor 10.

The register mapper 42 includes a memory having an entry for each logical register. The entry for each logical register in the register mapper 42 may store the scheduler number (SCH#) of the most recent op to update the logical register. Additional status may be stored in the rename map entries as well. For example, a bit may indicate whether or not the most recent op has been executed (and thus the dependency may be noted but may also be indicated as satisfied). In such an embodiment, the register mapper 42 may receive the signals from the scheduler 20 identifying the ops that have been scheduled in order to update the bit. A bit indicating whether or not the most recent op has been retired may also be included.

In response to the source operand addresses from the decode unit 16, the register mapper 42 may be configured to output the corresponding source operand numbers (SO#s) to the dependency vector generation unit 42. That is, the SO#s may be the SCH#s stored in the register mapper 42 for the corresponding logical register addresses from the operand fields of the ops. Accordingly, the SO#s may be used to determine the dependencies on previous ops for the current op (or ops) from the decode unit 16. The SO#s are also register addresses for the register file 22 for the source operands of the ops. In other embodiments, the destination register address may be assigned separately and the register mapper 42 may store the destination register number of the most recent op to update the logical register. The destination register address would be output as the SO# in such an embodiment.

The register mapper 42 also receives the SCH# (or destination register address) from the SCH# assignment unit 40. The register mapper 42 is configured to update the entries corresponding to the destination logical registers of the ops with the corresponding SCH#s. It is also possible that one or more ops presented to the register mapper 42 in parallel have dependencies on other ops presented in parallel. The register mapper 42 may include logic to bypass the SCH#s of the previous, in parallel ops as the SO#s of the dependent ops.

The SCH# assignment unit 40 may be configured to assign SCH#s (and thus scheduler entries) to the ops received from the decode unit 16. The SCH# assignment unit 40 may be configured to maintain a free list of scheduler entries, and may generally assign the entries in order to ops in program order. Thus, the program order of the ops may be the order of the ops in the scheduler 20. The scheduler 20 may be a circular buffer of ops, and thus the SCH#s may roll over from the maximum number to zero. Various mechanisms for handling the roll over may be used. For example, at a given point in time, the head and tail pointers in the scheduler may be used to discern the program order of ops in the scheduler at that point in time. In other embodiment, the SCH# may include an additional bit beyond the number of bits used to identify scheduler entries. The bit may be flipped for each rollover, allowing program order to be discerned without reference to the scheduler pointers.

The dependency unit 46 may be configured to generate dependency vectors for each op, transmitting the dependency vectors to the scheduler 20. The dependency vector for a given op may include dependencies corresponding to each SO# of the op, as well as any store dependencies indicated by the store hit load predictor 44. Other dependencies, for other purposes, may also be handled by the dependency unit 46 (e.g. to implement fence or synchronization ops, etc.).

It is noted that not all of the connections to the units shown in FIG. 2 are illustrated, and the mapper 18 may include additional circuitry implementing other operations, not shown. For example, the SCH# assignment unit 40 and the register mapper 42 may receive the redirect indications to adjust their mappings to account for the ops being flushed. Additionally, the SCH# assignment unit 40 and the register mapper 42 may receive an indication of retiring ops to adjust their state to the retirement (freeing scheduler entries for assignment to new ops, updating the architected rename state, etc.). These operations are ancillary to the operation of the store hit load predictor 44, and thus are not described in more detail herein.

It is noted that, while the SCH#s are used as an identifier for the stores (and the loads, for offset generation) in this embodiment, other embodiments may use any identifier that may uniquely identify instructions in flight within the processor 10 (e.g. any sort of tag or sequence number).

Figure 3:
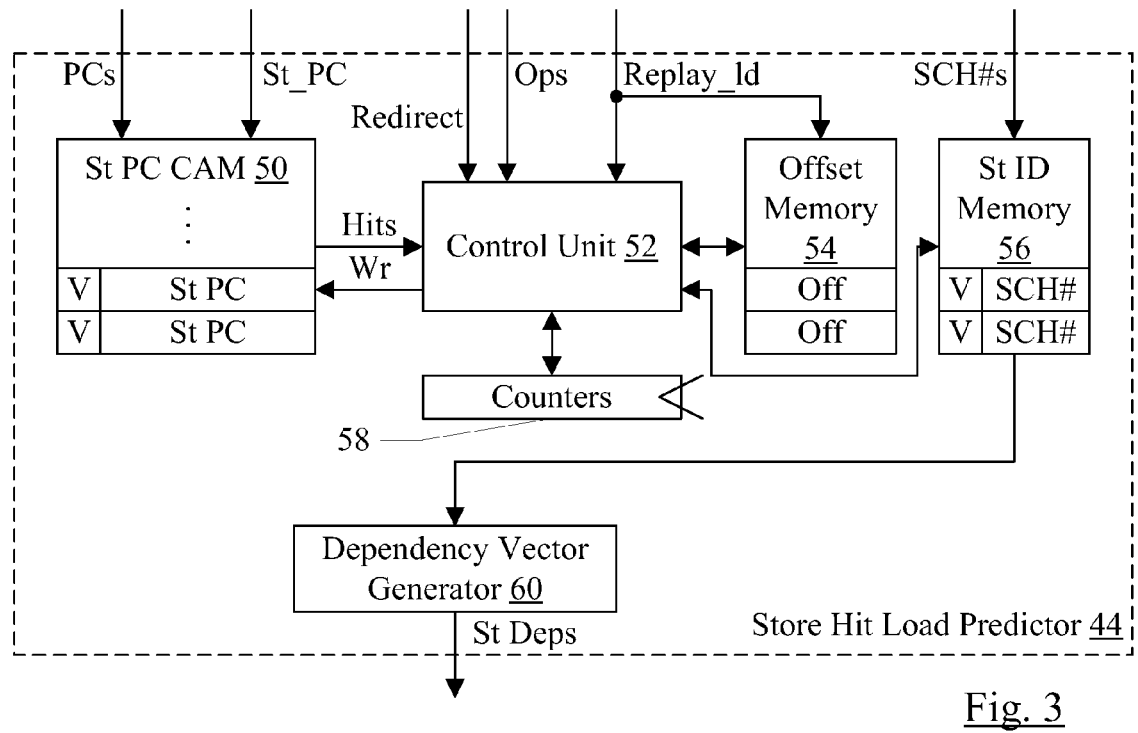
FIG. 3 is a block diagram of one embodiment of a store hit load predictor shown in FIG. 2.

Turning now to FIG. 3, a block diagram of one embodiment of the store hit load predictor 44 is shown. In the embodiment of FIG. 3, the store hit load predictor 44 includes a store PC CAM 50, a control unit 52, an offset memory 54, a store identifier (ID) memory 56, a set of counters 58, and a dependency vector generator 60. The store PC CAM 50 is coupled to receive the PCs from the decode unit 16 and the St_PC from the scheduler 20, and is coupled to the control unit 52. The control unit 52 is coupled to receive the redirect indication from the scheduler 20, the ops from the decode unit 16, and the Replay_Id communication from the LSU 26. The control unit 52 is further coupled to the offset memory 54, the store ID memory 56, and the counters 58. The offset memory 54 is coupled to receive an offset from the Replay_Id communication. The store ID memory 56 is coupled to receive the SCH#s from the SCH# assignment unit 40. The store ID memory 56 is coupled to the dependent vector generator 60.

The store PC CAM 50 comprises a plurality of entries, two of which are illustrated in FIG. 3. Each entry corresponds to a store, and is configured to store at least a portion of the PC of a store for which a store hit load event has been previously detected. In one embodiment, for example, a plurality of least significant bit of the store PC may be stored. For example, 10 least significant bits of the store PC may be stored. Other embodiments may store more bits of store PC, different bits, or even the entire store PC. Each entry may also store a valid bit (V), indicating whether or not the entry is valid.

The offset memory 54 comprises a plurality of entries as well, and the number of entries in the offset memory 54 may be the same as the number of entries in the store PC CAM 50. Each entry in the offset memory 54 corresponds to a respective entry of the store PC CAM 50, and stores an offset the describes the distance between the store and a subsequent load (in program order) for which the store hit load event was previously detected. The offset may be measured in ops, a distance between PCs, etc. Specifically, in this embodiment, the offset is measured in ops.

The store ID memory 56 also comprises a plurality of entries, and the number of entries in the store ID memory 56 may be the same as the number of entries in the store PC CAM 50. Each entry in the store ID memory 56 corresponds to a respective entry of the store PC CAM 50, and stores an identifier of the store that most recently hit in the respective entry of the store PC CAM 50. For example, the identifier is the SCH# assigned to the store, in this embodiment. Each entry may also include a valid bit indication whether or not the identifier is valid.

The PCs of the fetched ops provided by the decode unit 16 may be compared (cammed) against the store PC CAM 50. If the PC matches a store PC in an entry, and the entry is valid, the store PC CAM 50 may be configured to assert a corresponding hit signal to the control unit 52 (Hits in FIG. 3). In one embodiment, a given PC may match multiple entries in the store PC CAM 50, and multiple hits may be signalled for that given PC. Thus, there may be a hit signal for each entry in the store PC CAM 50, and for each op that may be concurrently provided from the decode unit 16. Alternatively, the control unit 52 may be configured to detect which ops are stores (if any), and may select the corresponding PCs to be cammed against the store PC CAM 50, which may permit reduced CAM ports on the store PC CAM 50 and a reduced number of hit signals form the store PC CAM 50.

The control unit 52 may receive the hit signals, and may be configured to qualify the hits with a determination that the corresponding op is actually a store. In cases where the store PC CAM 50 stores partial PCs, the qualification may reduce the number of hits that are incorrectly detected (because less than the full PC is compared). Other embodiments may not qualify the hit with detecting a store op. If the hit is validated as a store, the control unit 52 may be configured to read the corresponding entry in the offset memory 54. Additionally, the store ID memory 56 receives the SCH# of the store, and the control unit 52 may be configured to cause the store ID memory 56 to update with the SCH# (and set the valid bit). The control unit 52 may also be configured to initialize one of the counters 58, and the counter may be updated for each op subsequent to the store. Thus, for example, the counter may be immediately updated for ops that are provided concurrent with the store and that are subsequent to the store in program order, and may be subsequently updated as more ops are received.

When enough ops have been detected to exhaust the offset, the load that was previously replayed due to the store hitting the load is detected. In one embodiment, the control unit 52 may determine that the op identified by the offset is a load, and may only indicate the dependency on the store if the op is actually a load. In other embodiments, the op may not be qualified as a load. If the op is not actually a load, the op may be delayed until the prior store is issued, but correct operation will still ensue. The control unit 52 may be configured to read the corresponding entry in the store ID memory 56, and may provide the SCH# and valid bit to the dependency vector generator 60. If the IS SCH# is valid, the dependency vector generator 60 may be configured to generate a dependency vector indicating a dependency on the store. Multiple counters may expire on the same op (e.g. if a load has been replayed due to a store hit load event by more than one store). If so, the dependency vector generator 60 may be configured to generate the dependency vector with indications for multiple stores.

In one embodiment, there is one counter 58 corresponding to each entry in the store PC CAM 50. The counter may be initialized to the offset in response to the hit of the PC in the store PC CAM 50, and may be decremented for each subsequent op. The offset is exhausted when the counter reaches zero. In another embodiment, the counter may be initialized to zero, and may be incremented for each subsequent op. The offset is exhausted when counter reaches the offset (which may be stored in the counter or in a register for comparison to the counter). In other embodiments, there may be fewer counters 58 then entries in the store PC CAM 50. A counter may be initialized for each hit, and if all counters are in use when a new hit is detected, either one of the counters may be overwritten for the new hit or the new hit may be ignored. In such cases, a store hit load event may occur even if it could have been predicted, but correct operation will still result.

The store hit load predictor 44 may also be configured to update in response to the detection of store hit load events. In such cases, the store PC of the store that caused the store hit load event is provided by the scheduler 20 as the St_PC. The Replay_Id communication indicates the replay, and also supplies the offset between the store and the load. In other embodiments, the identifiers of the store and the load (the SCH#s) may be provided and the offset may be calculated by the control unit 52.

In response to the store hit load event, the control unit 52 may be configured to allocate an entry in the store PC CAM 50 (and thus the offset memory 54 and the store ID memory 56) for the store. The control unit 52 may be configured to allocate the memory in any desired fashion. For example, the control unit 52 may be configured to operate the store PC CAM 50 as a first in, first out (FIFO) memory, replacing the oldest entry in the store PC CAM 50 with the newly detected store. Other embodiments may implement other selection mechanisms (e.g. various least recently used (LRU) or pseudo-LRU mechanisms, random replacement, etc.). The control unit 52 may be configured to signal the store PC CAM 50 to update the selected entry with the store PC, and to set the valid bit. The control unit 52 may also be configured to cause the offset memory 54 to update with the corresponding entry with the offset for the store.

The store PC CAM 50 may be any type of memory that operates as a content addressable memory. For example, the store PC CAM 50 may be an integrated CAM memory (where each entry in the memory includes circuitry to make the comparison). The PC CAM 50 may also be a set of registers and comparators that are operated as a CAM. The memories 54 and 56 may similarly be implemented as any type of memory (e.g. a random access memory (RAM), a set of registers or other clocked storage devices, etc.). Additionally, while the memories 50, 54, and 56 are illustrated as separate memories, the memories may be integrated together. For example, the CAM 50 and the RAM 54 may be integrated, and a hit in the CAM portion may cause the memory to output the corresponding offset in addition to the hit signal.

As mentioned previously, the dependency vector generator 60 may be configured to generate store dependency vectors for loads. In other embodiments, rather than including the dependency vector generator 60, the store hit load predictor 44 may be configured to provide the store identifiers (SCH#s) to the dependency unit 46 to be included in the dependency vector generation.

In some embodiments, the store may be part of a microcode sequence or a sequence of ops to which a given instruction decodes in the hardware decoders. In such embodiments, the store PC CAM 50 may also store the offset of the store within the sequence. Ops that are part of a sequence may be tagged by the decode unit 10 with their offset within the sequence. Matching the store PC and the offset within the microcode sequence may more accurately identify a particular store within the sequence.

Figure 4:
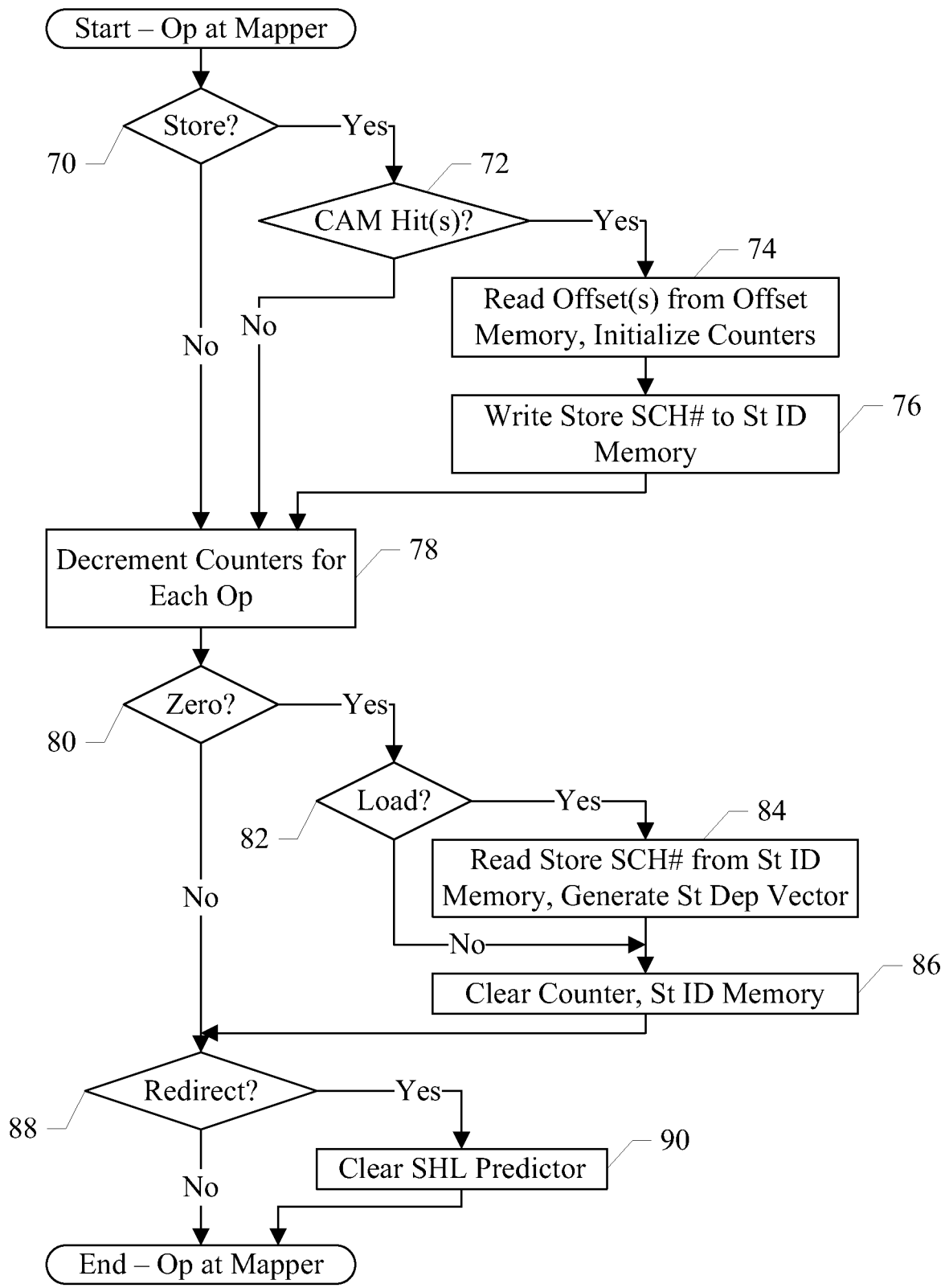
FIG. 4 is a flowchart illustrating operation of one embodiment of a store hit load predictor in response to an instruction operation received from the decode unit.

Turning now to FIG. 4, a flowchart is shown illustrating operation of one embodiment of the store hit load predictor 44 (and more particularly the control unit 52) in response to one or more fetched ops being presented to the mapper 18. While the blocks are shown in a particular order for ease of understanding, other orders may be used. Blocks may be performed in parallel in combinatorial logic within the store hit load predictor 44/control unit 52. Blocks, combinations of blocks, and or the flowchart as a whole may be pipelined over multiple clock cycles. Additionally, the sections of the flowchart that are related to processing one op may be performed in parallel for each op that is concurrently received at the mapper 18.

If the op is a store (decision block 70, "yes" leg), and there are one or more CAM hits for the store (decision block 72, "yes" leg), the control unit 52 may read the offset corresponding to each hit entry from the offset memory 54 and may initialize the corresponding counters 58 (block 74). In this embodiment, for example, the corresponding counters 58 may be initialized to the offset from the offset memory 54 and may be decremented for each subsequent op. In other embodiments, as mentioned above, the counters may be initialized to zero and incremented for each subsequent op. Additionally, the SCH# assigned to the hitting store may be written to the corresponding entry in the store ID memory 56 (block 76). As mentioned previously, in some embodiments, the CAM hits may not be validated as stores. In such embodiments, the decision block 70 may be eliminated.

The control unit 52 may decrement any active counters 58 to reflect each op that is presented to the mapper 18 (block 78). For example, if 3 ops are presented concurrently, the active counters 58 may be decremented by 3. If a counter 58 has reached zero (decision block 80, "yes" leg), the control unit 52 may optionally confirm that the identified op is a load (decision block 82). If so (decision block 82, "yes" leg), the control unit 82 may read the store SCH# from the corresponding entry in the store ID memory 56, and the dependency vector generator 60 may generate the dependency vector indicating the store dependency (block 84). If more than one counter expires on the same op, the SCH# for each expiring counter may be read and dependencies indicated in the store dependency vector. Whether or not the op is a load, the counter may be cleared and the corresponding entry in the store ID memory 56 may be invalidated (block 86).

Additionally, while not directly related to ops being presented at the mapper 18, the control unit 52 may detect that a redirect has been signalled (decision block 88, "yes" leg). Various corrective action may be taken in such cases. For example, the control unit 52 may simply clear the store hit load predictor 44 entirely (e.g. invalidating the store PC CAM 50 and the store ID memory 56) (block 90). Other embodiments may simply clear the counters, but may retain the trained store hit load data for the instructions after the redirect. Still other embodiments may take different action based on the reason for the redirect. For example, a branch misprediction may cause only the counters to be cleared, and an exception redirecting to an exception handler may cause the entire store hit load predictor 44 to be cleared.

Figure 5:
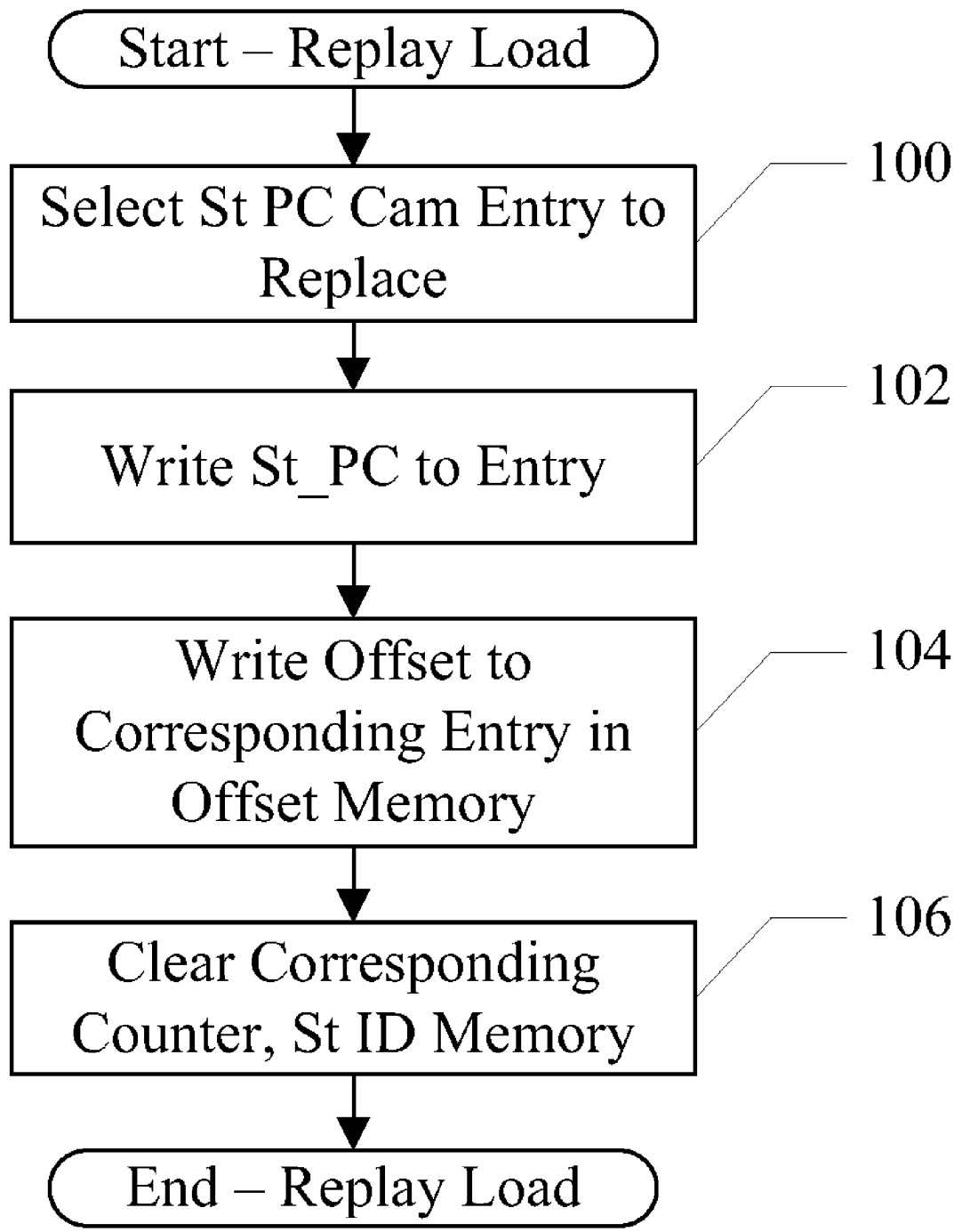
FIG. 5 is a flowchart illustrating operation of one embodiment of the store hit load predictor in response to a replay of a load memory operation.

Turning next to FIG. 5, a flowchart is shown illustrating operation of one embodiment of the store hit load predictor 44 (and more particularly the control unit 52) in response to a replay of a load (due to a store hit load event) being signalled by the LSU 26. While the blocks are shown in a particular order for ease of understanding, other orders may be used. Blocks may be performed in parallel in combinatorial logic within the store hit load predictor 44/control unit 52. Blocks, combinations of blocks, and or the flowchart as a whole may be pipelined over multiple clock cycles.

The control unit 52 may select a store PC CAM 50 entry to replace with the data related to the currently-detected store hit load event (block 100). As mentioned above, any of a variety of replacement policies may be used. Since the offset memory 54 and the store ID memory 56 each have entries that correspond to respective store PC CAM 50 entries, the selection of the store PC CAM 50 entry implicitly selects an entry in the offset memory 54 and the store ID memory 56 as well. The control unit 52 may write the store PC received from the scheduler 20 to the selected store PC CAM 50 entry, and may set the valid bit in the entry (block 102). The control unit 52 may also write the offset between the store and the load into the corresponding entry of the offset memory 54 (block 104). Since the entry has been overwritten, the control unit 52 may clear the corresponding counter 58, and invalidate the corresponding entry in the store ID memory 56, to ensure that data related to the previous store represented in the entry is removed (block 106).

Figure 6:
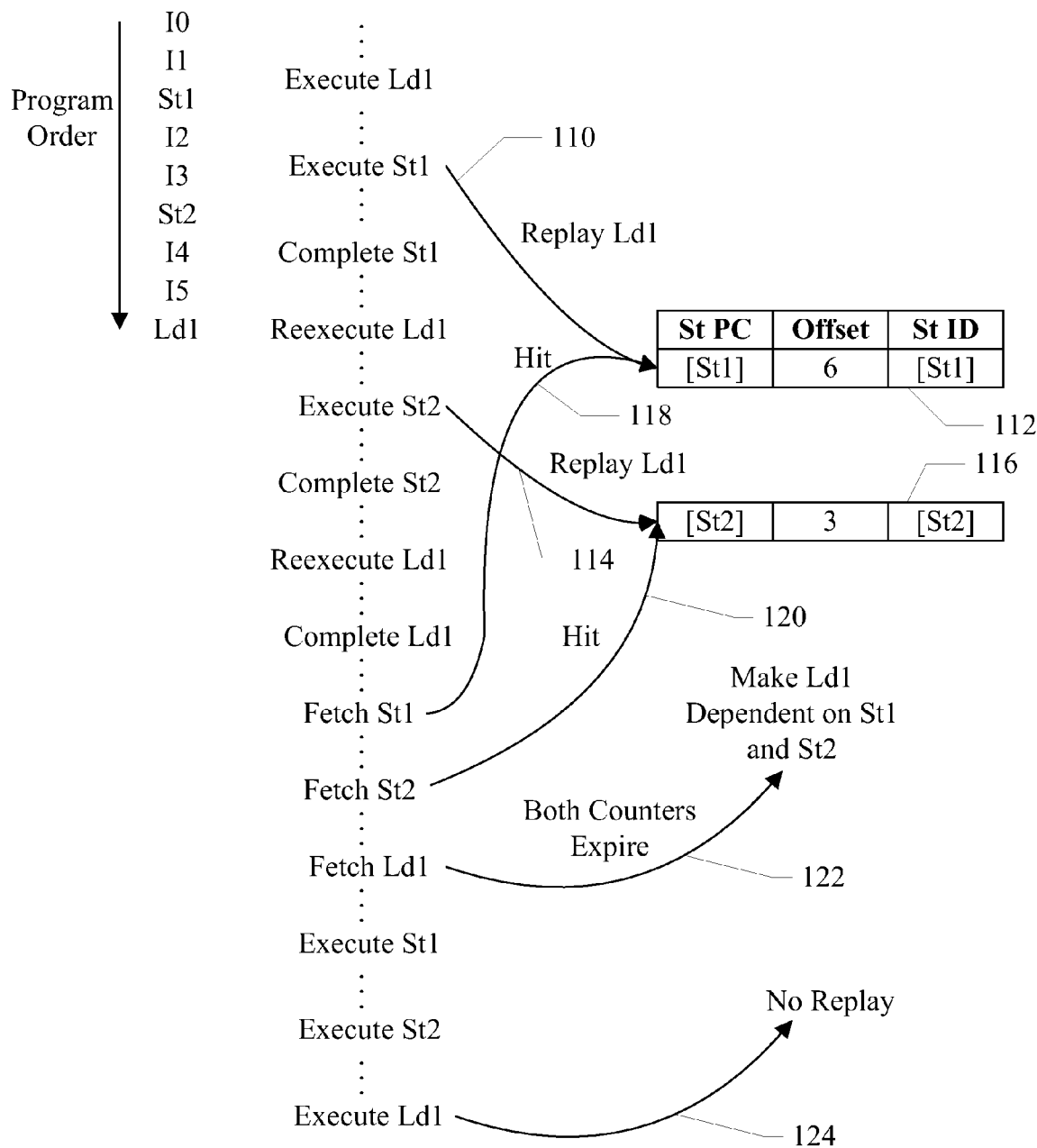
FIG. 6 is an example of the operation of one embodiment of the store hit load predictor.

Turning now to FIG. 6, an example of a code sequence in which store hit load events are detected and the operation of the store hit load predictor 44 for one embodiment is shown. Specifically, the example illustrates the case in which two stores can cause load hit store events on the same load. The exemplary code sequence is shown in the left side in FIG. 6, with program order flowing from top to bottom as illustrated by the vertical arrow. The code sequence includes non-load/store ops 10 to 15, a first store op (St1), a second store op (St2), and a load op (Ld1). The Ld1 overlaps with St1 and St2, for this example. Accordingly, if the load op executes out of order with respect to either or both of the store ops, the load will return out of date data and will be replayed.

A series of events are illustrated in FIG. 6 for the load and store ops, with the order of events progressing from top to bottom in FIG. 6. Ld1 is executed out of order with respect to St1 and St2. Subsequently, St1 is executed and a replay of the Ld1 is detected for the store hit load event (arrow 110). The store hit load event causes the store hit load predictor 44 to allocate a first entry 112 in the store hit load predictor memories to St1. The store hit load predictor 44 may write the store PC in the entry 112 with the PC of St1, and the offset is calculated as 6 ops (12, 13, St2, 14, 15, Ld1). Subsequently, St1 completes and Ld1 is reexecuted ("Complete St1" and "Reexecute Ld1" in FIG. 6). It is noted that the reexecution of Ld1 and the completion of St1 may occur in either order. If Ld1 is reexecuted before St1 completes, the store data may be forwarded from the LSQ 28 for the load, or the load may be replayed until the store completes, in various embodiments.

Subsequent to reexecuting Ld1, St2 is executed. St2 also hits on Ld1, and thus Ld1 is replayed again for the store hit load event (arrow 114). The store hit load event causes the store hit load predictor 44 to allocate a second entry 116 in the store hit load predictor memories to St2. The store hit load predictor 44 may write the store PC in the entry 116 with the PC of St2, and the offset is calculated as 3 ops (14, 15, Ld1). Subsequently, St2 completes and Ld1 is reexecuted and completes ("Complete St2", "Reexecute Ld1", and "Complete Ld1" in FIG. 6). It is noted that the reexecution of Ld1 and the completion of St2 may occur in either order, similar to the discussion above with regard to Ld1 and St1.

Subsequently, the code sequence shown in FIG. 6 may be fetched again by the processor. St1 may be fetched, and may hit in the entry 112 (arrow 118). The store hit load predictor 44 may read the offset of 6 from the entry 112, and may write the store ID for St1 to the entry 112. The store hit load predictor 44 may then begin to monitor for the sixth op after St1 to identify Ld1. Similarly, St2 may be fetched and may hit in the entry 116 (arrow 120). The store hit load predictor 44 may read the offset of 3 from the entry 116, and may write the store ID for St2 to the entry 116. The store hit load predictor 44 may then begin to monitor for the third op after St2 to identify Ld1. Ld1 may be fetched, and both counters 58 corresponding to entries 112 and 116 may expire on the Ld1 op (arrow 122). Ld1 may thus be made dependent on both St1 and St2. It is noted that, while the three fetches are shown in series in FIG. 6, they may actually occur in parallel, or two of the fetches may occur in parallel. In such cases, Ld1 may arrive at the mapper 18 concurrently with St2 and/or St1. The control unit 52 may include logic to handle such situations.

Because Ld1 is dependent on St1 and St2, both St1 and St2 execute before Ld1. In this case, Ld1 is not replayed for the store hit load event because both St1 and St2 have already executed (arrow 124).

Numerous variations and modifications will become apparent to those skilled in the art once the above disclosure is fully appreciated. It is intended that the following claims be interpreted to embrace all such variations and modifications.

What is claimed is:

1. A store hit load predictor comprising:
a first memory comprising a first plurality of entries, wherein each of the first plurality of entries is configured to store at least a portion of a first program counter (PC) corresponding to a store memory operation;
a second memory comprising a second plurality of entries, each of the second plurality of entries corresponding to a respective entry of the first plurality of entries and configured to store an offset between the store memory operation in the respective entry and a subsequent load memory operation in program order which was hit by the store memory operation during execution of the store memory operation; and
a control unit coupled to the first memory and the second memory, and wherein the control unit is configured to detect a hit of an input PC of a fetched store memory operation on a first entry in the first memory, and wherein the control unit is configured to read the offset from the corresponding entry in the second memory to identify a subsequently fetched load memory operation responsive to the hit of the input PC of the fetched store memory operation on the first entry, and wherein the control unit is configured to cause a dependency of the subsequently fetched load memory operation on the fetched store memory operation responsive to the offset, wherein the dependency prevents the subsequently fetched load memory operation from executing prior to the fetched store operation.

2. The store hit load predictor as recited in claim 1 further comprising a plurality of counters, each counter corresponding to the respective entry of the first plurality of entries, wherein the control unit is configured to initialize a first counter of the plurality of counters that corresponds to the plurality of entries in response to the fetched store memory operation hitting in the first entry, and wherein the control unit is configured to update the counter in response to each subsequently fetched instruction operation to locate the subsequently fetched load memory operation.

3. The store hit load predictor as recited in claim 2 wherein the first counter is initialized to the offset, and wherein the update of the counter is a decrement for each subsequently fetched instruction operation, and the first counter reaching zero indicates the subsequently fetched load memory operation.

4. The store hit load predictor as recited in claim 2 wherein the first counter is initialized to zero, and wherein the update of the counter is an increment for each subsequently fetched instruction operation, and the first counter equaling the offset indicates the subsequently fetched load memory operation.

5. The store hit load predictor as recited in claim 1 further comprising a third memory comprising a third plurality of entries, each of the third plurality of entries corresponding to the respective entry of the first plurality of entries and configured to store an identifier of the fetched store memory operation, wherein the control unit is configured to read a third entry of the third plurality of entries that corresponds to the first entry to generate the dependency of the fetched load memory operation on the fetched store memory operation.

6. The store hit load predictor as recited in claim 5 wherein the identifier is a scheduler tag identifying a scheduler entry in a scheduler that stores the store memory operation, wherein the scheduler is configured to issue instruction operations for execution.

7. A processor comprising:
an execution core configured to execute instruction operations including load and store memory operations, wherein the execution core is configured to detect a first load memory operation that is hit by a first store memory operation during execution of the first store memory operation; and
a store hit load predictor coupled to receive an indication of the first load memory operation, wherein the store hit load predictor is configured to record an indication of the first store memory operation and an offset between the first store memory operation and the first load memory operation in response to the first load memory operation being hit by the first store memory operation;
and wherein the store hit load predictor is configured to detect a hit of a store memory operation in the store hit load predictor responsive to the store memory operation being fetched, and wherein the store hit load predictor is configured to use a corresponding offset read from the store hit load predictor in response to the hit of the store memory operation to locate a subsequently fetched load memory operation and to cause a dependency of the fetched load memory operation on the fetched store memory operation.

8. The processor as recited in claim 7 wherein the store hit load predictor is configured to initialize a counter with the corresponding offset, and to update the counter responsive to subsequently fetched instruction operations to locate the subsequently fetched load memory operation.

9. The processor as recited in claim 7 wherein the store hit load predictor is configured to record an identifier of the fetched store memory operation to generate the dependency on the fetched load memory operation.

10. The processor as recited in claim 9 further comprising a scheduler coupled to the execution core and configured to issue instruction operations for execution, wherein the identifier locates the fetched store memory operation in the scheduler.

11. The processor as recited in claim 9 wherein the execution core is configured to signal a replay of the first load memory operation in response to the first store memory operation hitting on the first load memory operation, and wherein the replay comprises reissuing the first load memory operation from the scheduler without refetching the first load memory operation.

12. The processor as recited in claim 7 wherein the indication of the first store memory operation is at least a portion of a program counter (PC) address of the first store memory operation.

13. The processor as recited in claim 7 wherein the execution core comprises a load/store unit that comprises a queue, wherein a load/store unit is configured to store the data address accessed by the first load memory operation in the queue during execution of the first load memory operation, and wherein the load/store unit is configured to compare the data address accessed by the first store memory operation to the addresses in the queue to detect that the first store memory operation hits the first load memory operation.

14. The processor as recited in claim 13 wherein the queue is further configured to store a first identifier of the first load memory operation, and wherein the first identifier of the first load memory operation is used to generate the offset.

15. The processor as recited in claim 14 further comprising a scheduler coupled to the execution core and configured to issue instruction operations for execution, wherein the first identifier locates the first load memory operation in the scheduler.

16. The processor as recited in claim 15 wherein a second identifier locates the first store memory operation in the scheduler, and wherein the offset is the difference between the identifier and the second identifier.

17. A method comprising:
executing a first store memory operation in a processor;
detecting a hit of the first store memory operation on a first load memory operation in the processor;
recording an indication of the first store memory operation and a distance between the first store memory operation and the first load memory operation in a store hit load predictor in the processor in response to detecting the hit of the first store memory operation on the first load memory operation;
fetching the first store memory operation for execution subsequent to the executing;
detecting a hit in the store hit load predictor for the first store memory operation responsive to accessing the store hit load predictor with an instruction pointer of the first store memory operation;
responsive to the hit in the store hit load predictor, using the distance read from the store hit load predictor to locate the first load memory operation when subsequently fetched; and
recording a dependency of the first load memory operation on the first store memory operation responsive to locating the first load memory operation.

18. The method as recited in claim 17 further comprising issuing the first store memory operation for execution prior to issuing the first load memory operation responsive to the dependency.

19. The method as recited in claim 17 further comprising:
executing a second store memory operation in a processor;
detecting a hit of the second store memory operation on the first load memory operation in the processor;
recording an indication of the second store memory operation and a second distance between the second store memory operation and the first load memory operation in a store hit load predictor in the processor;
fetching the second store memory operation for execution subsequent to the executing;
detecting a hit in the store hit load predictor for the second store memory operation;

responsive to the hit in the store hit load predictor, using the second distance to locate the first load memory operation when subsequently fetched; and recording a second dependency of the first load memory operation on the second store memory operation responsive to locating the first load memory operation, whereby the first load memory operation is dependent on both the first store memory operation and the second store memory operation.

20. The method as recited in claim 17 wherein the distance is determined from a number of instruction operations between the first store memory operation and the first load memory operation in program order.

* * * * *